(12) United States Patent
August

(10) Patent No.: US 7,206,440 B2
(45) Date of Patent: *Apr. 17, 2007

(54) IMAGE SMOOTHING WITH DECOUPLED REGULARIZATION

(75) Inventor: Jonas August, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 542 days.

This patent is subject to a terminal disclaimer.

(21) Appl. No.: 10/366,742

(22) Filed: Feb. 14, 2003

(65) Prior Publication Data

US 2003/0219152 A1 Nov. 27, 2003

Related U.S. Application Data

(60) Provisional application No. 60/357,151, filed on Feb. 14, 2002.

(51) Int. Cl.
*G06K 9/00* (2006.01)

(52) U.S. Cl. .......................... 382/131; 378/4; 378/901

(58) Field of Classification Search ................ 382/128, 382/129, 130, 131, 132–134; 600/407, 425, 600/443, 447, 458; 378/4, 21, 901; 250/363.02, 250/363.04; 128/922
See application file for complete search history.

(56) References Cited

U.S. PATENT DOCUMENTS

| | | | | |
|---|---|---|---|---|
| 4,579,121 A | * | 4/1986 | Macovski | 600/410 |
| 4,736,751 A | * | 4/1988 | Gevins et al. | 600/545 |
| 5,565,684 A | * | 10/1996 | Gullberg et al. | 250/363.04 |
| 5,841,890 A | * | 11/1998 | Kraske | 382/131 |
| 6,186,949 B1 | * | 2/2001 | Hatfield et al. | 600/443 |
| 6,628,984 B2 | * | 9/2003 | Weinberg | 600/436 |

OTHER PUBLICATIONS

F. Natterer, The Mathematics of Computerized Tomography, Wiley, Chirchester, 1986, pp. 1-221.
Jeffrey A. Fessler and Scott D. Booth, Conjugategradient Proconditioning Methods for Shift-Variant PET Image Reconstruction, IEEE Trans. on Image Proc., vol. 8, No. 5, pp. 1-15, 1999.
Ken Sauer and Charles Bouman, A Local Update Strategy for Iterative Reconstruction From Projections, IEEE Transactions on Signal Processing, vol. 41, No. 2, pp. 1-35, 1993.

(Continued)

*Primary Examiner*—Jingge Wu
*Assistant Examiner*—Abolfazl Tabatabai
(74) *Attorney, Agent, or Firm*—Jones Day; Edward L. Pencoske

(57) ABSTRACT

A technique for simplifying the processing of tomographic imagery (e.g., CT and PET) via statistical smoothing is disclosed. An image smoothness criterion is imposed in the projection domain while identifying data that matches observed data within a desired tolerance. The present invention thus amounts to a computation entirely in the projection domain. As a result, the standard (and somewhat expensive) practice of numerically iterating between the image and projection domains is avoided. Also, the fundamental system of equations having on the order of m p unknowns is decoupled into p independent systems of m unknowns each, where there are p projections of m measurements each. The present invention thus provides a processing technique defined in a single domain, which may be carried out via parallel processing.

28 Claims, 9 Drawing Sheets

OTHER PUBLICATIONS

Jeffrey A. Fessler, Edward P. Ficaro, Neal H. Clinthorne, and Kenneth Lange, Grouped-Coordinate Ascent Algorithms for Penalized-Likelihood Transmission Reconstruction, IEEE Trans. on Med. Imaging, vol. 16, No. 2, pp. 1-11, 1997.

Erkan U. Mumcouglu, Richard M. Leahy, and Simon R. Cherry, Bayesian Reconstruction of PET Images: Methodology and Performance Analysis, Phys. Med. Biol., vol. 41, pp. 1777-1807, 1996.

Jolyon Browne and Alvarol R. De Pierro, A Row-action Alternative to the EM Algorithm for Maximizing Likelihoods in Emission Tomography, IEEE Trans. on Medical Imaging, vol. 15, No. 5, pp. 687-699, 1996.

Sigurdur Helgason, The Radon Transform, Birkhauser, Boston, 2nd Edition, 1999, pp. 1-192.

Hiroyuki Kudo and Tsuneo Saito, Sinogram Recovery With the Method of Convex Projections for Limited-Data Reconstruction in Computed Tomography, J. Opt. Soc. Am. A, vol. 8, No. 7, pp. 1148-1160, 1991.

Jiang Hsieh, Adaptive Streak Arifact Reduction in Computed Tomography Resulting From Excessive X-ray Photon Noise, Med. Phys., vol. 25, No. 11, pp. 2139-2147, 1998, pp. 2139-2147, 1998.

B. De Man, J. Nuyts, P. DuPont, G. Marchal, and P. Suetens, Reduction of Metal Streak Artifacts in X-ray Computed Tomography Using a Transmission Maximum a Posteriori Algorithm, IEEE Trans. on Nuclear Science, vol. 47, No. 3, pp. 977-981, 2000.

La Riviere, Patrick J., "Nonparametric Regression Sinogram Smoothing Using a Roughness-Penalized Poisson Likelihood Objective Function," IEEE Transactions on Medical Imaging, vol. 19, No. 8, pp. 773-786, Aug. 2000.

Fessler, Jeffrey A. et al., "Tomographic Reconstruction using Information-Weighted Spline Smoothing," IPMI 1993, pp. 372-386, Jan. 2002.

Pelegrini, M. et al., "Two-dimensional statistical model for regularized backprojection in SPECT," Phys. Med. Biol., vol. 43, pp. 421-434, 1998.

F. Natterer Saarbrucken, "Efficient Implementation of 'Optimal' Algorithms in Computerized Tomography," Math. Meth. in the Appl. Sci, vol. 2, pp. 545-555, Jan. 1980.

* cited by examiner

IMAGE SMOOTHING WITH DECOUPLED REGULARIZATION

CROSS-REFERENCE TO RELATED APPLICATIONS

The present invention claims priority from U.S. Provisional Application No. 60/357,151 entitled "Simplifying Tomography With Decoupled Regularization" filed Feb. 14, 2002, the entirety of which is hereby incorporated by reference.

BACKGROUND OF INVENTION

Tomographic images are produced by converting observed projections (data) into an image. For example, in x-ray CT imaging, x-ray beams are directed at an object and the beams are attenuated by various amounts due to varying structures within the object. On the other side of the object, the attenuated beams are measured with detectors. Such projections are produced at many different angles around the object. Not only are these measurements noisy, the relative noise level depends upon the amount of attenuation. Projections through dense materials such as bone and especially metal have lower signal-to-noise ratios than projections through flesh, water, or other less dense materials. Coping with the large and spatially varying fluctuations in the number of detected photons often requires a statistical smoothing technique, also known as regularization, to improve the image.

In the absence of noise, a basic problem of CT scans amounts to determining an unknown image $f=f(x, y)$ from its projections, or Radon transform $Rf$ where $(.Rf)(t,\theta):=\int\int f(xy)\delta(t-x \cos \theta - y \sin \theta)\, dx\, dy$, where $(x, y)$ are planar coordinates, $t$ is the location along each projection, and $\theta \in [0, \pi]$ is the orientation of the projection. Unfortunately, because measurements are never perfect, what is actually observed is the noisy projection data $g=g(t,\theta)$. To emphasize the essentials of the tomography problem, the unknown $f=f(x,y)$ and the observed $g=g(t,\theta)$ are viewed as functions, although the implementation is discrete. Next, assume the standard independence and locality assumptions that the likelihood $P(g|f)$ or conditional distribution of $g$ given $f$, equals $\Pi p(g(t,\theta)\,|(Rf)(t\,\theta,))$, where the product is over all $(t,\theta)$. This product may be nonzero if a finite number of factors is taken. Here, the observed number of x-ray photons $b \exp(-g(t,\theta))$ is Poisson distributed with mean $w(t,\theta):=b \exp(-(Rf)(t,\theta))$, where $b$ is the mean number of incident photons and $f(x, y)$ is the attenuation coefficient at $(x, y)$. The task is to infer the image $f$ given noisy projections $g$.

Because this inverse problem is ill-posed, one typically imposes extra constraints on $f$. In regularization, a type of penalized maximum likelihood, inferring $f$ amounts to finding that $f$ which minimizes $-\ln P(g\,|f)+p(f)$, where $p(f)$ characterizes the extra constraint on $f$. Here we impose smoothness via the gradient $$\nabla f = \left(\frac{\partial f}{\partial x}, \frac{\partial f}{\partial y}\right)$$

with the quadratic penalty $p(f)=\beta\|\nabla f\|^2$, where $\beta>0$ and $\|f\|^2=(f,f)$, using the inner product $(f_1, f_2)=\int f_1 f_2$. Following Saver et al., "A local update strategy for iterative reconstruction from projections", IEEE Transactions of signal Processing, vol. 41, no. 2, pp. 534–548 (1993), and to simplify the presentation, I approximate$\times$ln $P(g|f)$ with the quadratic form $\|g-Rf\|_w^2$ where $\|g\|_w^2 =(g, Wg)$ is a weighted norm with (diagonal) weight operator $W$ satisfying $(Wg)(t,\theta)=w(t,\theta)g(t,\theta)$. The weight $w(t,\theta)$ is small for those rays passing through dense materials such as bone or metal, and larger otherwise. This formulation of tomography requires solving the following "hard" optimization problem.

Problem 1 (Coupled Regularization). Given the projection data $g$, find the image $f$ that minimizes $$\|g-Rf\|_w^2 + \beta\|\nabla f\|^2.$$

(Because $w$ depends on $Rf$, which is unknown, we use $g$ instead to obtain a quadratic functional above. In general, however, one could solve the full nonlinear problem and only make this substitution as a first guess of $w$. One can compute $f$ iteratively, using the current best estimate of $Rf$ to set $w$.) To proceed, let $\Delta$ denote $$\frac{\partial^2}{\partial x^2} + \frac{\partial^2}{\partial y^2},$$

the Laplacian in the plane. Using integration by parts and zero boundary conditions, recall that $\|\nabla f\|^2=(f,-\Delta f)$. Then the (linear) Euler-Lagrange equation for Problem 1 is $$R^*WRf - \beta\left(\frac{\partial^2}{\partial x^2} + \frac{\partial^2}{\partial y^2}\right)f = R^*Wg, \qquad (1)$$

where $f$ is unknown and $A^*$ denotes the adjoint (or transpose) of linear operator $A$ ($R^*$ is also known as the backprojection operator). By examining equation (1), we see that Problem 1 is hard in two related ways.

First, the problem constraints occur in two different domains. Fidelity to the data ($\|g-Rf\|_w^2$) is enforced in the Radon domain $\{(t,\theta)\}$, while smoothness ($\|\Box f\|^2$) is imposed in the image domain $\{(x, y)\}$. Thus in equation (1) the operators $R$ and $R^*$ are for shuffling back and forth between these domains; iterative solution techniques typically compute these forward and backprojections explicitly and often at great expense.

Second, observe that equation (1) is a coupled equation in the two-variable functions, i.e., in the large set of variables $\{f(x,y),\text{ for all } x,y\}$ under some reasonable discretization of $x$ and $y$. The coupling arises first because both $x$ and $y$ derivatives are present; in addition, $R$ and $R^*$ are integral operators, and so are not even local. The computational difficulty in solving equation (1) and related tomographic problems (e.g., emission) has spawned a great deal of work in optimization.

Thus, the need exists for a processing technique which can be formed in a single domain.

SUMMARY OF THE INVENTION

A method of reconstructing an image is comprised of scanning an object to obtain projection data. The projection data is decomposed by projection angle. For each projection angle, a solution is obtained to an inference problem which is defined in a single domain. The solution may include, for example, finding projections $h=Rf$ minimizing:

$$\|g - h\|_w^2 + \beta'(h, T^{-3}h), \text{ where } \beta' := \frac{\beta}{4\pi}.$$

The corresponding Euler-Lagrange equation is:

$$Wh + \beta T^{-3}h = Wg \quad (2)$$

An image is reconstructed from the obtained solution by using the standard method of filtered backprojection, which computes $f = R^{-1}h$.

The present invention is directed to a technique for simplifying the processing of tomographic imagery (e.g., CT and PET) via statistical smoothing that decouples the fundamental system of equations having on the order of m p unknowns into p independent systems of m unknowns each, where there are p projections of m measurements each. That allows for more rapid processing of medical imagery for clinical use because (1) solving a system of equations having on the order of m p unknowns typically requires much more computation and memory than solving p systems of equations in m unknowns each and (2) the p systems of equations can be solved on separate processors in parallel because they are independent systems of equations.

The basic idea of regularization is to infer a smooth image whose simulated projections approximate the observed but noisy data. The difficulty is that the standard regularization specifies the two basic constraints in different domains. More specifically, one constraint on a property related to the smoothness of the image must be specified in the image domain while a second constraint on the closeness to the observed data is specified in the projection domain. Enforcing these two constraints computationally requires a constant numerical conversion between the two domains during processing which is difficult and computationally expensive. The present invention (1) imposes an image smoothness criterion in the projection domain before any computations begin, and (2) identifies data that matches observed data within a desired tolerance. The present invention thus amounts to a computation entirely in the projection domain. As a result, the standard (and somewhat expensive) practice of numerically iterating between the image and projection domains is avoided. An added benefit of the analytical conversion of the smoothness constraint to the projection domain is the decoupling of a large system of regularization equations into many small systems of simpler regularization equations. Those advantages and benefits, and others, will be apparent from the description of the invention below.

BRIEF DESCRIPTION OF THE DRAWINGS

For the present invention to be readily understood and easily practiced, the present invention will now be described, for purposes of illustration and not limitation, in connection with preferred embodiments in which.

DESCRIPTION OF THE INVENTION

Figure 1:
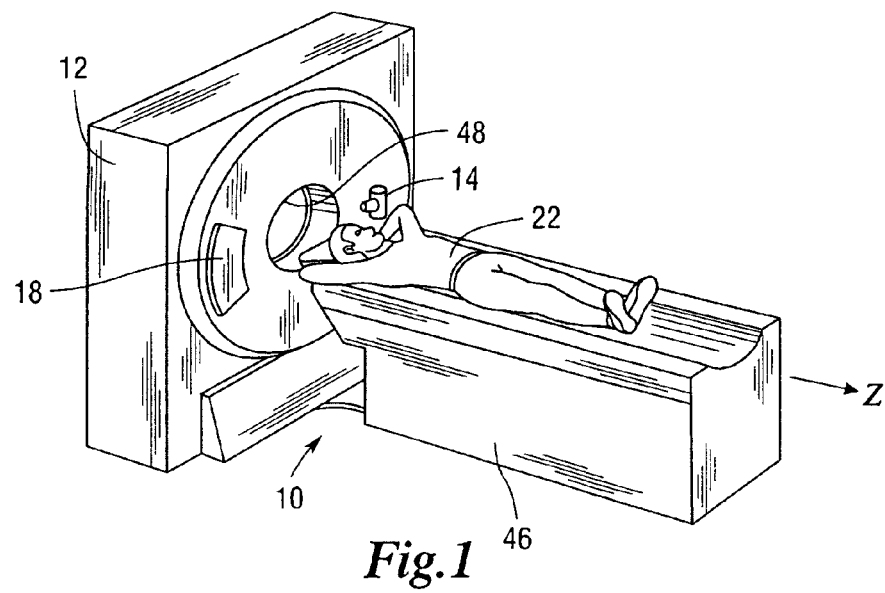
FIG. 1 and FIG. 2 illustrate typical hardware for generating data on which the method of the present invention may be practiced.
Figure 2:
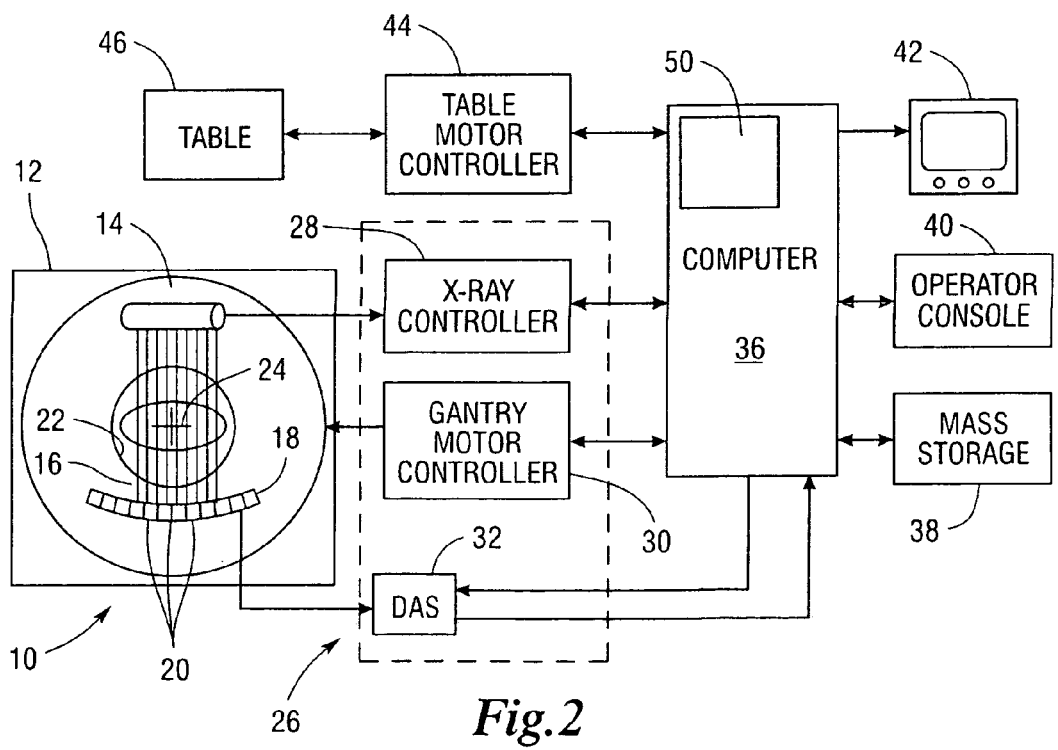

Referring to FIGS. 1 and 2, a computed tomographic (CT) imaging system 10 is shown as including a gantry 12. Gantry 12 has an x-ray source 14 that projects a beam of x-rays 16 toward a detector array 18 on the opposite side of gantry 12. Detector array 18 is formed by detector elements 20 which together sense the projected x-rays that pass through an object 22, for example a medical patient. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system 32 in control mechanism 26 samples analog data from detector elements 20 and converts that data to digital signals for subsequent processing by a computer 36 which then stores the image in a mass storage device 38.

Computer 36 also receives commands and scanning parameters from an operator via console 40 that has a keyboard. An associated display 42 allows the operator to observe the reconstructed image and other data from computer 36. The operator supplied commands and parameters are used by computer 36 to provide control signals and information to data acquisition system 32, x-ray controller 28 and gantry motor controller 30. In addition, computer 36 operates a table motor controller 44 which controls a motorized table 46 to position patient 22 in gantry opening 48.

In a multi-slice imaging system 10, detector array 18 comprises a plurality of parallel detector rows, wherein each row comprises a plurality of individual detector elements 20. An imaging system 10 having a multi-slice detector array 18 is capable of providing a plurality of images representative of a volume of object 22. Each image of the plurality of images corresponds to a separate "slice" of the volume. The "thickness" or aperture of the slice is dependent upon the thickness of the detector rows.

The hardware described in conjunction with FIGS. 1 and 2 is standard, commercially available hardware. Additionally, because the likelihood function may depend upon the particular imaging modality, I have described the present invention in connection with an x-ray CT scanning for concreteness, although my technique applies more broadly, including other tomographic imaging modalities such as PET. Furthermore, in the following discussion, I have focused on the two-dimensional problem with standard parallel geometry, but the ideas readily extend to three-dimensions and other scanning geometries, e.g. fan geometries.

This invention formulates the entire inference problem in a single domain. As demonstrated below, working solely in the Radon domain decouples the large joint estimation problem into many smaller ones.

Recall that in regularized tomography the standard technique for inverting the Radon transform is filtered backprojection (FBP). Let the Fourier transform of $g=g(t,\theta)$ with respect to the first variable $t$ be denoted $(F_1 g)(r,\theta) = (2\pi)^{-1/2} \int g(t,\theta) e^{-irt} dt$, where $r$ is the spatial frequency along a projection (for each fixed $\theta$).

Given function $h=h(t,\theta)$, the Riesz potential is the linear operator $I^\alpha$ satisfying $(F_1 I^\alpha h)(t,\theta) = |r|^{-\alpha} (F_1 h)(t,\theta)$ Given noise-free observations $h=Rf$, one can solve for the unknown $f$ by directly implementing the following classical formula for the inverse of the Radon transform:

Fact 1 (Filtered Backprojection).

$$\mathcal{R}^{-1} = \frac{1}{4\pi} \mathcal{R}^* I^{-1}.$$

By defining $\square$ as the Laplacian $\partial^2/\partial t^2$ each projection, we can also use the Riesz potential to define the "square root" of $-\square$. (Clearly $I^{\alpha_1} I^{\alpha_2} = I^{\alpha_1 + \alpha_2}$.)

Fact 2. $I^{-2} = -\square$

The proof is that the Fourier transform of $-\square$ is $\tau^2 = |r|^2$. Now recall the Fourier slice theorem, which says that the two-dimensional Fourier transform of $f$, evaluated at polar coordinates $(r, \theta)$, is $(F_1 Rf)(r,\theta)$. Using this theorem, one can relate the two Laplacians $\Delta$ and $\square$ because the two-dimensional Fourier transform of $-\Delta$ is $u^2 + v^2$ (where $u$ and $v$ are spatial frequencies for $x$ and $y$, respectively), or $|r|^2$ in polar coordinates, which is the one-dimensional Fourier transform of $-\square$. For details and the extension to higher dimensions, see Natterer, "The Mathematics of Computerized Tomography", Wiley, Chirchester (1986) Chapters 1 and 7. This is called "intertwining".

Fact 3. The Radon transform R intertwines $\Delta$ and $\square$, i.e., $$R\Delta = \square R.$$

By applying these facts to Problem 1, we need only solve an equivalent set of smaller equations, thus partially "decoupling" the regularization problem. The idea is to reformulate Problem 1 in terms of $h=Rf$. Then smoothness constraint $\|\nabla f\|^2 = \langle f, -\Delta f\rangle$ becomes $\langle R^{-1}h, -\Delta R^{-1}h\rangle = \langle h, -R^{-1*}\Delta R^{-1}h\rangle$. This constraint can be simplified using the following Lemma, which exploits the "intertwining" Fact 3 to analytically "shuffle" smoothness from the image domain to the Radon domain.

Lemma 1 (Decoupling).

$$-\mathcal{R}^{-1*} \Delta \mathcal{R}^{-1} = \frac{1}{4\pi} I^{-3}.$$

The proof begins by observing that $R^{-1*}$ equals $(4\pi)^{-1} I^{-1} R$, using Fact 1 and the symmetry of $I^\alpha$. But then $-R^{-1*} \Delta R^{-1}$ equals $-(4\pi)^{-1} R\Delta R^{-1} = -(4\pi)^{-1} I^{-1} \square R'R^{-1}$, using Fact 3. Lemma 1 follows using Fact 2 and because $RR^{-1}$'s the identity operator.

Thus Problem 1 can be posed in an equivalent, "easy" form, as follows:

Problem 2 (Decoupled Regularization). Given observed projections g, find projections $h=Rf$ minimizing $$\|g - h\|_w^2 + \beta'(h, I^{-3}h), \text{ where } \beta' := \frac{\beta}{4\pi}.$$

The corresponding Euler-Lagrange equation, $$Wh + \beta' T^{-3} h = WG \qquad (2)$$

where h is unknown, is easy exactly where equation (1) is hard. First, the forward and backprojections are eliminated from the optimization; backprojection need only be done once to determine f from solution h. Second, equation (2) is really a decoupled set of systems of equations, where each system corresponds to the unknowns $\{h(t,\theta), \text{ for all } t\}$, at each fixed $\theta$. This follows because operator W is pointwise multiplied by a scalar and $I^{-3}$ acts only along t for each fixed $\theta$ (using the definition of the Riesz potential). Thus for each fixed $\theta$, we have an integral equation in the unknown single variable function $h=Rf$. Because $h=Rf$, we can find $f$ using filtered backprojection. Thus my approach to processing CT data is to solve equation (2).

The decoupled regularization equation (2) is related to direct algebraic reconstruction tomography (DART) by emphasizing optimization entirely in the Radon domain. However, DART was not developed to deal with the Poisson noise model considered in many statistical approaches to tomography, and in effect assumed an invariance constraint regarding the weights $w(t,\theta)$, which is often not the case in real images. Thus decoupled regularization gains the benefits of space-varying filtering while maintaining the simplicity of DART. Although the proposed approach does not impose an image support constraint, the results obtained show strong improvement over the prior art.

To solve equation (2), $W + \beta' I^{-3}$ is a positive definite operator (if $W > 0$), and thus the conjugate gradient method can be applied. To discretize the equations, I sampled in t and $\theta$ uniformly. The operator W was implemented by restriction to the sample locations. The Riesz potential was implemented by taking 1-dimensional FFTS. For greater fidelity to the Poisson noise model, one can use the said conjugate gradient method as a linear solver in an inexact Newton's method.

Figure 3:
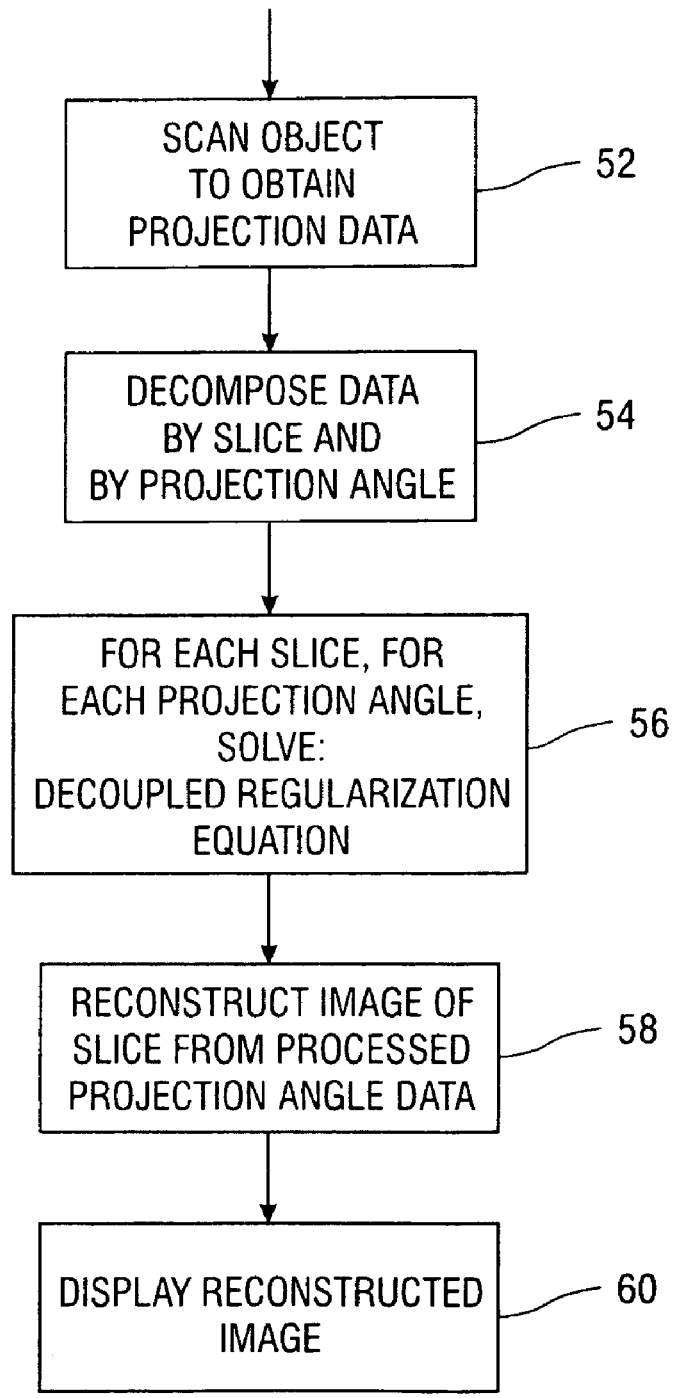
FIG. 3 is a flow chart illustrating the basic steps of the method of the present invention.

Turning now to FIG. 3, after the object 22 (e.g. patient) is positioned within gantry opening 48, the method illustrated in FIG. 3 may be carried out under control of the computer 36. In FIG. 3, at step 52, the object 22 is scanned to obtain projection data. At step 54, the projection data is decomposed by slice and by projection angle. Thereafter, at step 56, for each slice, equation (2) above is solved. Any known technique for solving linear equations, including iterative techniques, may be used to solve equation (2). Thereafter, at step 58, an image of the slice is reconstructed from the processed projection angle data. The reconstructed image may be displayed at step 60 or may be stored for future use, analysis, or transmission to another location. The method of FIG. 3 (e.g. steps 54, 56, 58 and 60) is preferably implemented in software which may be carried as a set of instructions in a computer readable medium (50 in FIG. 2) which may take any known form.

An application of the present invention is in medical tomographic imaging. PET scans, for example, are very noisy when processed using the standard filtered backprojection (FBP) technique, and therefore, computationally expensive regularization is applied. X-ray CT images can be badly degraded by the presence of metal in the scanned patient, giving rise to offensive streaking artifacts. Metal is often present in dental CT scans (in tooth fillings), in hip scans after hip replacement surgery, in gun shot victims, and in luggage for security inspection at an airport. Bone and other dense materials also create streaking artifacts in CT images as well. The disclosed method allows for much more rapid processing of these degraded images to significantly improve their quality as illustrated in FIGS. 4–7.

Figure 4:
FIG. 4 illustrates streaking artifacts due to the presence of metal in an x-ray CT slice of a hip.
Figure 5:
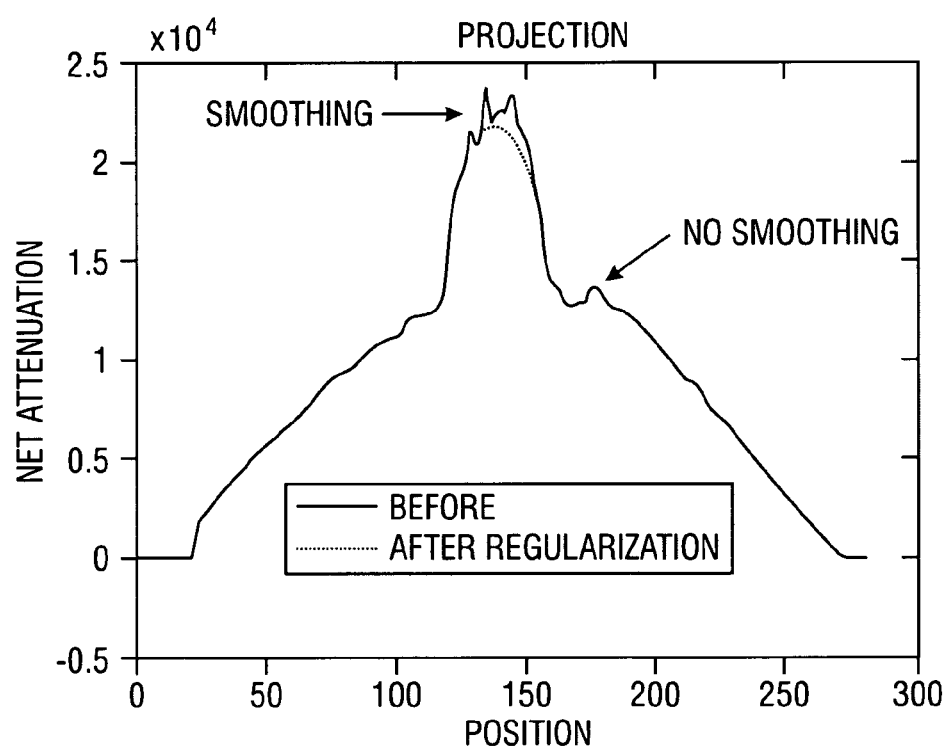
FIG. 5 illustrates a simulated projection (solid curve, g (–, θ)) oriented at θ≈45° which is noisy particularly in the 150 position due to the presence of metal; the projection is adaptively smoothed by the decoupled regularization of the present invention (dotted curve, h (–, θ)), because there the weights are the lowest.
Figure 6A:
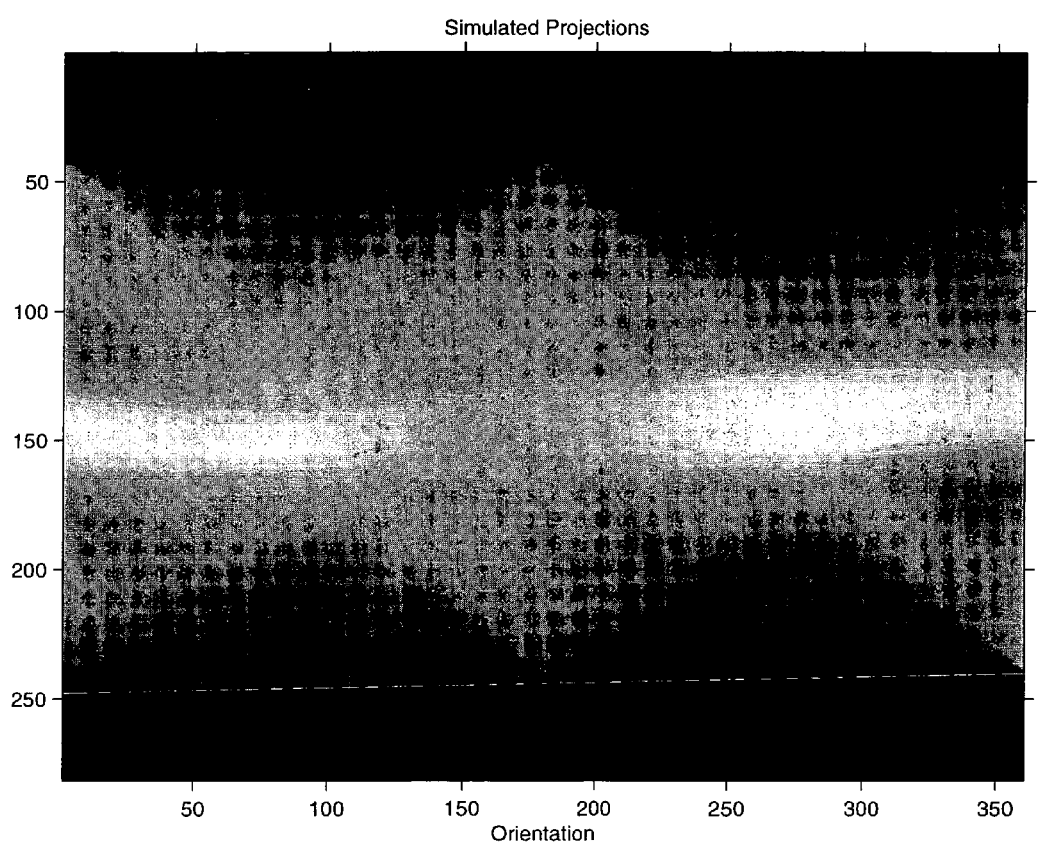
FIG. 6A illustrates simulated projections g (t,θ), or Radon transform, for the cropped region of FIG. 7A which shows a bright band due to the metal.
Figure 6B:
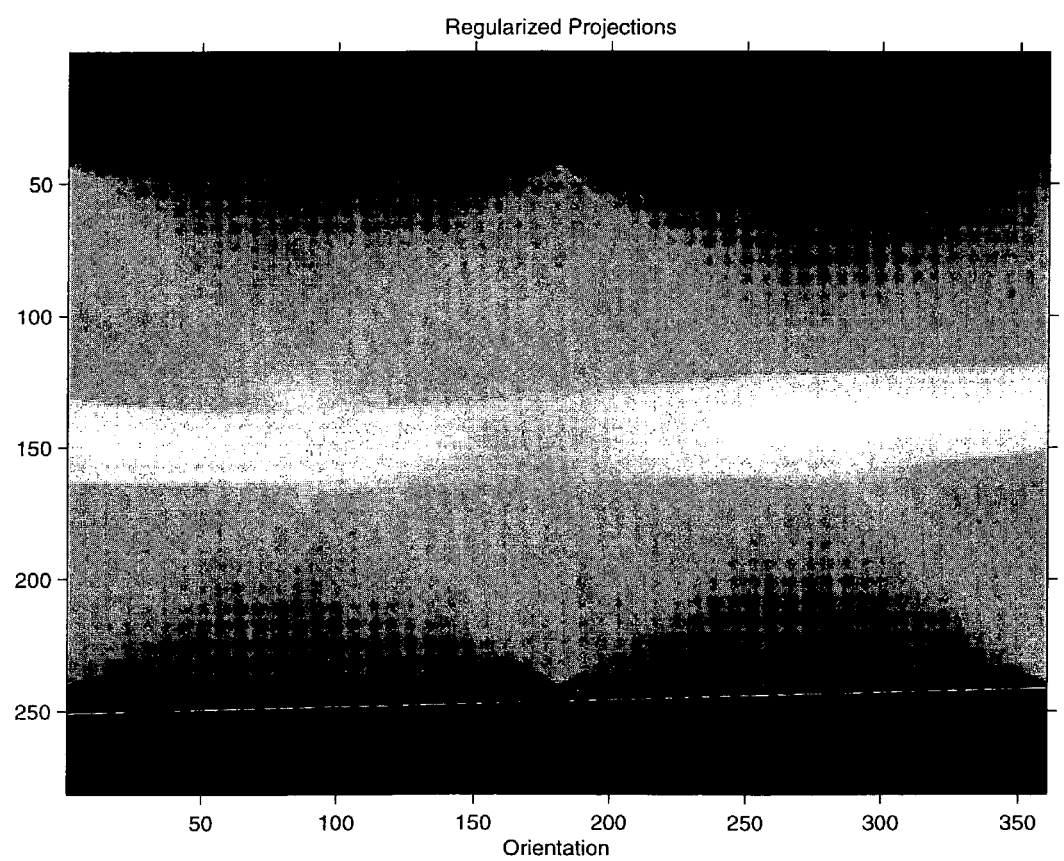
FIG. 6B illustrates the band of FIG. 6A after being smoothed by decoupled regularization, resulting in h (t,θ)
Figure 6C:
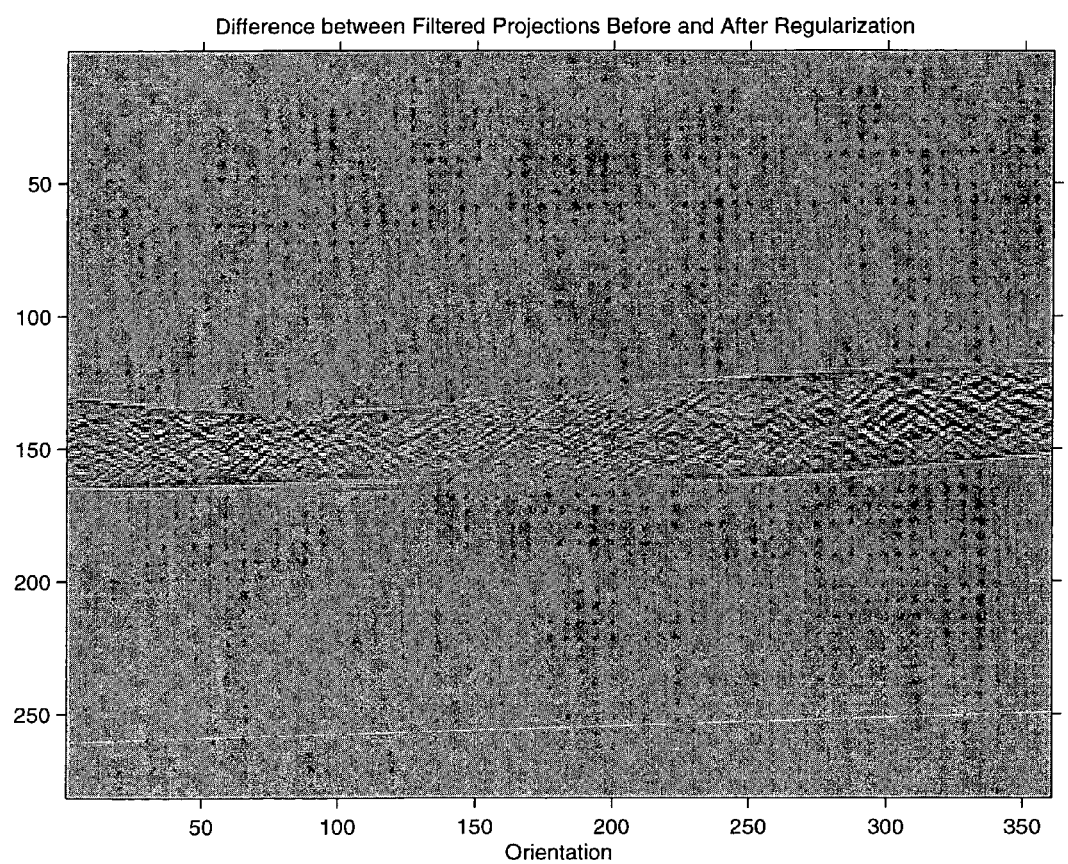
FIG. 6C illustrates the smoothing being localized on the metal band as a result of performing $I^{-1}$ (a kind of differentiation and the first step in filtered backprojection) on the difference g–h.
Figure 7A:
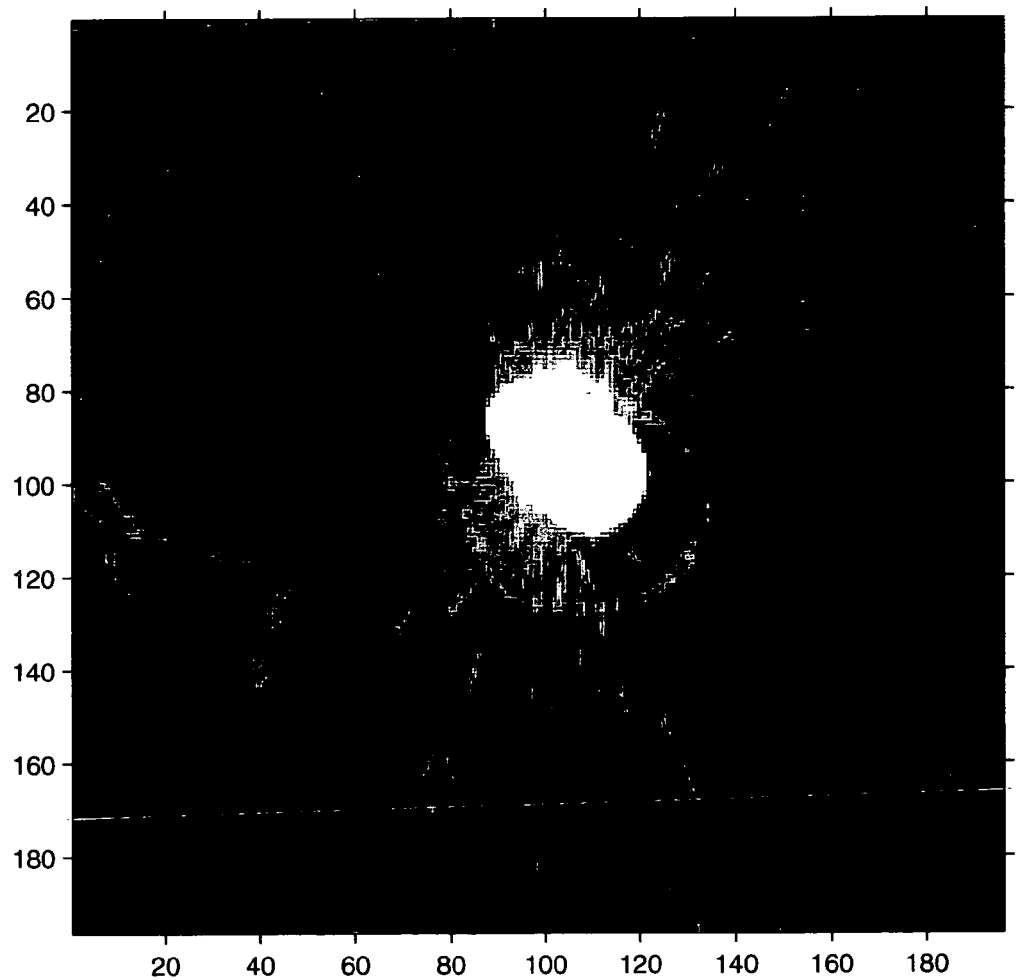
FIGS. 7A and 7B illustrate that the streaking artifacts in the cropped image region around the metal (FIG. 7A) are significantly reduced by the application of the decoupled regularization method of the present invention; note that the smoothing effect is primarily near the site of the metal while the rest of the image remains sharp.
Figure 7B:
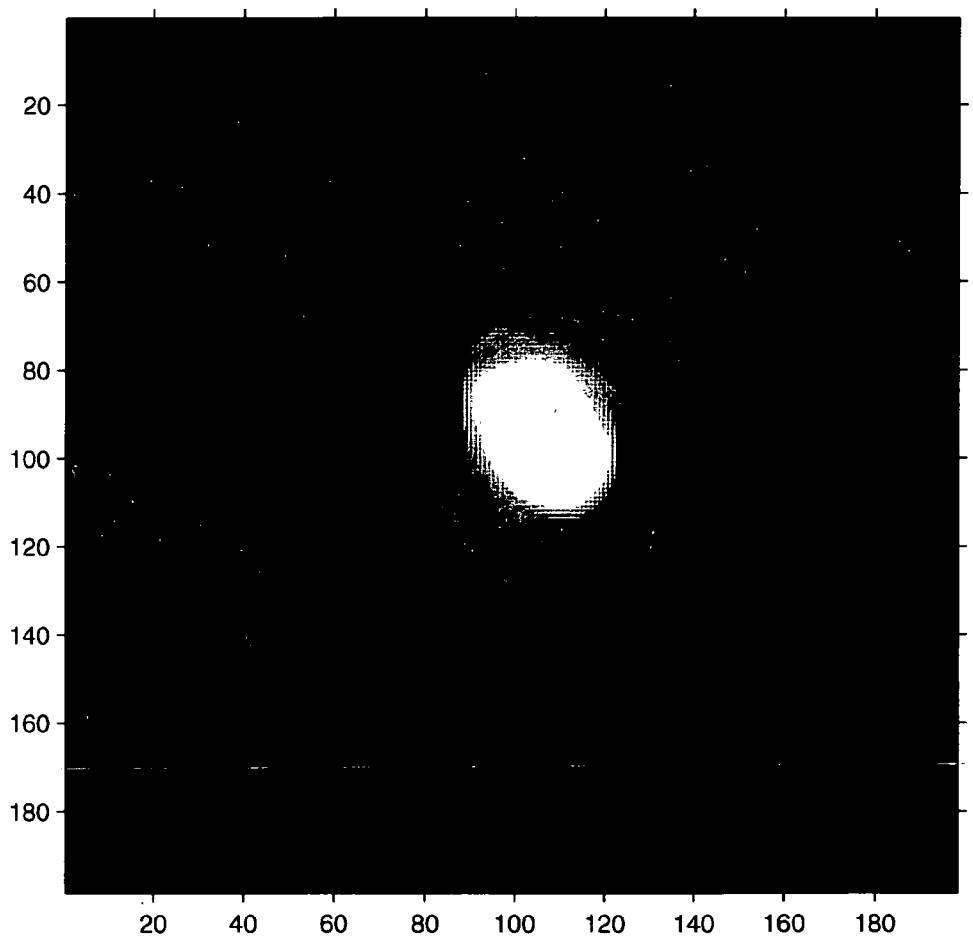

FIG. 4 illustrates streaking artifacts due to the presence of metal in an x-ray CT slice of a hip. For this sample computation, I cropped out an image region around the metal component to produce the cropped image shown in FIG. 7A. I then simulated the projection data (which were unavailable) by taking the (numerical) Radon transform in Matlab (see FIG. 6A). The bright band results from the metal, and is noisier than elsewhere; this is more evident in the single projection in the solid curve of FIG. 5. For each fixed projection orientation θ, the decoupled regularization equation (2) was solved to produce the nonhomogenously smoothed projection shown in FIG. 5. After this smoothing of each projection independently, a set of processed projections is obtained as shown in FIG. 6B. FIG. 6C illustrates the smoothing being localized on the metal band as a result of performing T* (a kind of differentiation and the first step in filtered backprojection) on the difference g–h. Using filtered backprojection, the final result is obtained as shown in FIG. 7B, and shows reduced streaking artifacts.

By studying regularized tomography in the continuous domain, I was able to decouple a linear equation in a two-variable function into a one-parameter family of linear equations in single-variable functions. Although I emphasized a quadratic approximation of the x-ray CT likelihood, my result is based upon Lemma 1, which is independent of the imaging modality. For example, one can set up decoupled nonlinear equations to fully capture the Poisson likelihood. This technique can also be applied in three dimensions by noting that Facts 1–3 can be extended to higher dimensions. The gradient smoothness term can be replaced with related higher-order derivative penalties while maintaining the decoupling of the regularization; or one could combine such smoothness or other image constraints provided essentially that one can obtain the analogue of the above intertwining of operators for the constraint in question. The standard regularization approach, which the present invention replaces, implicitly ensures that the inferred image will have nonzero values only in a limited region which includes the patient. This is known as a consistency constraint. The present invention does not specifically enforce this constraint, as doing so would recouple the systems of equations. Not only are these equations smaller and thus easier to solve than standard tomographic equations, but their solutions for different angles can be computed in parallel on separate processors with no communication beyond distributing the workloads.

This method readily applies in more general situations as well. This method applies to other tomographic imaging modalities such as PET, by altering the noise model. Essentially one must substitute the first term in Problem 1 with the appropriate negative log-likelihood for the modality in question. The realism of the model even with CT can be improved as well, while maintaining the benefits of decoupling. Specifically, the weight matrix need not be completely decoupled; instead, it could allow for intra-projection couplings. In addition, to allow for the reality that real scanners do not exactly follow the Radon transform, one can replace R with BR in Problem 1, where B is a linear operator which blurs within each projection. This captures the fact that x-rays are not always in perfect focus.

One could also abandon the decoupling aspect and only take advantage of the transformation of the image smoothness or regularity constraint to the projection domain. This would allow more general blur matrices B and image smoothness constraints, at the cost of having to solve a fully coupled equation; the advantage of avoiding repeated forward and backprojections would be maintained.

While the present invention has been described in connection with exemplary embodiments thereof, those of ordinary skill in the art will recognize that many modifications and variations are possible. The present invention is intended to cover such modifications and variations and is to be limited only by the scope of the following claims.

What is claimed is:

1. A method of reconstructing an image by operating on projection data obtained for an object, comprising:
   selecting a regularity constraint defined in an image domain;
   decomposing the projection data by projection angle for each of a plurality of projection angles;
   updating said projection data for each of said plurality of projection angles by imposing said selected regularity constraint on said projection data; and
   reconstructing an image by combining said updated projection data.

2. The method of claim 1 wherein said updating is performed iteratively.

3. The method of claim 1 wherein said updating is performed in a parallel manner.

4. The method of claim 1 additionally comprising one of storing and displaying said reconstructed image.

5. The method of claim 1 wherein said object is an image and said scanning is performed by numerical computation.

6. The method of claim 5 wherein said image is an array of numbers and said numerical computation is a weighted summation of said numbers along each of a family of contours.

7. The method of claim 1 wherein said scanning is performed by transmission of X-rays through said object.

8. The method of claim 1 wherein said scanning is performed by detection of emitted radiation from said object.

9. The method of claim 1 wherein said updating is performed by solving an optimization problem where the unknown is said updated projection data and a criterion to be optimized in said optimization problem includes said selected regularity constraint.

10. A method of reconstructing an image, comprising:
    scanning an object to obtain projection data;
    decomposing the projection data by projection angle;
    for each projection angle, obtaining a solution to an inference problem defined in a single domain; and
    reconstructing an image from said solutions, and wherein said obtaining a solution comprises solving (B*WB+T)h=B*Wg, wherein
g is the projection data;
h is the said solution;
B is a linear operator defining the system response for the projection data;
B* is the transpose of operator B;
W is a linear weighting operator; and
T is a linear operator resulting from transformation of a selected image regularity constraint to said single domain.

11. A method of reconstructing an image, comprising:
scanning an object to obtain projection data;
decomposing the projection data by projection angle;
for each projection angle, obtaining a solution to an inference problem defined in a single domain; and
reconstructing an image from said solutions, and wherein said inference problem comprises the optimization of the criterion $D(g,h)+(h-\bar{h})^*T(h-\bar{h})$,
wherein
g is the projection data
h is the said solution;
$\bar{h}$ is an approximation of said solution;
$(h-\bar{h})^*$ is the transpose of $h-\bar{h}$;
$D(g,h)$ is a scalar-valued function for defining the consistency of said g with said h; and
T is a linear operator resulting from transformation of a selected regularity constraint to said single domain.

12. A computer readable medium carrying a set of instructions which, when executed, perform a method of reconstructing an image by operating on projection data obtained for an object, said method comprising:
decomposing the projection data by projection angle for each of a plurality of projection angles;
updating said projection data for each of said plurality of projection angles by imposing a selected regularity constraint defined in an image domain on said projection data; and
reconstructing an image by combining said updated projection data.

13. A computer readable medium carrying a set of instructions which, when executed, perform a method comprising:
decomposing the projection data by projection angle;
for each projection angle, obtaining a solution to an inference problem defined in a single domain; and
reconstructing an image from said solutions, and wherein said obtaining a solution to an inference problem additionally comprises instructions for solving $(B^*WB+T)h=B^*Wg$,
wherein
g is the projection data;
h is the said solution;
B is a linear operator defining the system response for the projection data;
B* is the transpose of operator B;
W is a linear weighting operator; and
T is a linear operator resulting from transformation of a selected regularity constraint to said single domain.

14. A computer readable medium carrying a set of instructions which, when executed, perform a method comprising:
decomposing the projection data by projection angle;
for each projection angle, obtaining a solution to an inference problem defined in a single domain; and
reconstructing an image from said solutions, and wherein said obtaining a solution to an inference problem additionally comprises instructions for optimizing $D(g,h)+(h-\bar{h})^*T(h-\bar{h})$, wherein
g is the projection data
h is the said solution;
$\bar{h}$ is an approximation of said solution;
$(h-\bar{h})^*$ is the transpose of $h-\bar{h}$;
$D(g,h)$ is a scalar-valued function for defining the consistency of said g with said h; and
T is a linear operator resulting from transformation of a selected regularity constraint to said single domain.

15. A method of processing projection data obtained for an object according to an image regularity constraint defined in an image domain and transformed into a projection regularity constraint in a projection domain, comprising:
decomposing the projection data by projection angle;
for each of said projection angles, updating projection data to satisfy said projection regularity constraint while matching observed projection data within a desired tolerance.

16. The method of claim 15 wherein said updating is carried out iteratively until said desired tolerance is matched.

17. The method of claim 15 wherein said updating is carried out in a parallel manner.

18. The method of claim 15 additionally comprising reconstructing an image from said updated projection data.

19. The method of claim 18 additionally comprising one of storing and displaying said reconstructed image.

20. A computer readable medium carrying a set of instructions which, when executed, perform a method of processing projection data obtained for an object according to an image regularity constraint defined in an image domain and transformed into a projection regularity constraint in a projection domain, said method comprising:
decomposing the projection data by projection angle;
for each of said projection angles, updating projection data to satisfy said projection regularity constraint while matching observed projection data within a desired tolerance.

21. A method of processing observed data to correct for missing or anomalous data by using only said observed data, comprising:
converting a first criterion relevant in a first domain into a second domain of observed data;
decomposing the observed data by a parameter relevant to the observed data, for each of a plurality of parameter values;
imposing a second criterion on observed data; and
updating said observed data in said second domain for each of said plurality of parameter values to satisfy both said first criterion and said second criterion.

22. The method of claim 21 wherein said second criterion is imposed according to a weighting dependent on one of location and observed data.

23. The method of claim 21 wherein said updating is carried out iteratively until a desired tolerance is satisfied.

24. The method of claim 21 wherein said identifying updating is carried out in a parallel manner.

25. The method of claim 21 additionally comprising converting said updated data into said first domain.

26. The method of claim 25 wherein said updated data is projection data and said converting includes reconstructing an image from said updated projection data.

27. A computer readable medium carrying a set of instructions which, when executed, perform a method of processing observed data to correct for missing or anomalous data by using only said observed data, said method comprising:
converting a first criterion relevant in a first domain into a second domain of observed data;

decomposing the observed data by a parameter relevant to the observed data, for each of a plurality of said parameter values;

imposing a second criterion on observed data; and updating said observed data in said second domain for each of said plurality of said parameter values to satisfy both said first criterion and said second criterion.

28. A method for reducing streaking artifacts in an X-ray tomographic image of an object with high-density material by operating on projection data obtained for the object, comprising:

decomposing the projection data by projection angle for each of a plurality of projection angles;

updating said projection data for each of said plurality of projection angles by imposing a selected regularity constraint on said projection data to correct for missing or anomalous data due to high density materials; and reconstructing an image by combining said updated projection data.

* * * * *

UNITED STATES PATENT AND TRADEMARK OFFICE
CERTIFICATE OF CORRECTION

PATENT NO. : 7,206,440 B2
APPLICATION NO. : 10/366742
DATED : April 17, 2007
INVENTOR(S) : Jonas August It is certified that error appears in the above-identified patent and that said Letters Patent is hereby corrected as shown below:

On Title Page
Item 56
Page 2, Column 1, Line 20, delete "Arifact" and substitute therefore --Artifact--.

Column 1, Lines 33 - 34, the formula should appear as follows:

$$--(Rf)(t,\theta) := \iint f(x,y)\delta(t - x\cos\theta - y\sin\theta)--$$

Column 1, Line 43, after "P(g|f)" insert --,--.

Column 1, Line 55, after "f" insert --.--.

Column 1, Line 66, delete "signal" and substitute therefore --Signal--.

Column 2, Line 1, delete "approximatexln" and substitute therefore --approximate - In--.

Column 2, Line 41, the formula should appear as follows:

$$-- \left(\|\nabla f\|^2\right) --$$

Column 2, Line 48, delete "functions" and substitute therefore --function--.

Column 3, Lines 7 - 9, after " $Wh + \beta' T^3 h = Wg$ " insert --,--.

Column 5, Line 20, the formula should appear as follows:

$$-- (F_1 I^\alpha h)(\tau,\theta) = |\tau|^{-\alpha}(F_1 h)(\tau,\theta)--$$

Column 5, Line 31, after "$\partial^2/\partial t^2$" insert --along--.

Column 5, Line 38, delete "off" and substitute therefore --of $f$ --.

UNITED STATES PATENT AND TRADEMARK OFFICE
CERTIFICATE OF CORRECTION

PATENT NO. : 7,206,440 B2
APPLICATION NO. : 10/366742
DATED : April 17, 2007
INVENTOR(S) : Jonas August It is certified that error appears in the above-identified patent and that said Letters Patent is hereby corrected as shown below:

Column 5, Lines 56 - 57, the formula should appear as follows:

$$-- \langle R^{-1}h, -\Delta R^{-1}h \rangle = \langle h, -R^{-1} * \Delta R^{-1}h \rangle --$$

Column 6, Line 3, the formula should appear as follows:

$$-- -(4\pi)^{-1} \Gamma^{-1} R \Delta R^{-1} = -(4\pi)^{-1} \Gamma^{-1} \square RR^{-1} --$$

Column 6, Line 4, delete "$RR^{-1}s$" and substitute therefore -- $RR^{-1}$ is --.

Column 6, Lines 17 - 18, the formula should appear as follows:

$$-- Wh + \beta' \Gamma^3 h = Wg --,$$

Column 6, Line 50, delete "FFTS" and substitute therefore --FFTs--.

Column 7, Line 33, delete "T*" and substitute therefore -- $\Gamma^{-1}$ --.

Column 10, Line 55, delete "identifying".

Signed and Sealed this

Eleventh Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 7,206,440 B2  
APPLICATION NO. : 10/366742  
DATED : April 17, 2007  
INVENTOR(S) : Jonas August Page 1 of 1

It is certified that error appears in the above-identified patent and that said Letters Patent is hereby corrected as shown below:

Title page, item [*], delete "This patent is subject to a terminal disclaimer."

Signed and Sealed this  
Twenty-third Day of April, 2013

Teresa Stanek Rea  
*Acting Director of the United States Patent and Trademark Office*